(12) United States Patent
Hammersley et al.

(10) Patent No.: US 10,249,205 B2
(45) Date of Patent: Apr. 2, 2019

(54) SYSTEM AND METHOD FOR INTEGRATING SPECIAL EFFECTS WITH A TEXT SOURCE

(71) Applicant: Novel Effect Inc, Olympia, WA (US)

(72) Inventors: Matthew William Hammersley, Seattle, WA (US); Melissa Furze Hammersley, Seattle, WA (US)

(73) Assignee: Novel Effect, Inc., Seattle, WA (US)

( * ) Notice: Subject to any disclaimer, the term of this patent is extended or adjusted under 35 U.S.C. 154(b) by 0 days.

(21) Appl. No.: 15/095,753

(22) Filed: Apr. 11, 2016

(65) Prior Publication Data

US 2016/0358620 A1 Dec. 8, 2016

Related U.S. Application Data

(60) Provisional application No. 62/264,276, filed on Dec. 7, 2015, provisional application No. 62/172,760, filed on Jun. 8, 2015.

(51) Int. Cl.
| | |
|---|---|
| *G09B 5/06* | (2006.01) |
| *A63H 5/00* | (2006.01) |
| *A63H 33/38* | (2006.01) |
| *G10L 15/08* | (2006.01) |

(52) U.S. Cl.
CPC ............... *G09B 5/062* (2013.01); *A63H 5/00* (2013.01); *A63H 33/38* (2013.01); *G10L 2015/088* (2013.01)

(58) Field of Classification Search
None
See application file for complete search history.

(56) References Cited

U.S. PATENT DOCUMENTS

| | | |
|---|---|---|
| 5,569,868 A | 10/1996 | Leung |
| 6,334,104 B1 | 12/2001 | Hirai |
| 6,655,586 B1 | 12/2003 | Back et al. |
| 7,201,317 B2 | 4/2007 | Song |
| 7,644,000 B1 | 1/2010 | Strom |
| 8,568,189 B2 | 10/2013 | Garbos et al. |
| 2002/0069073 A1 | 6/2002 | Fasciano |
| 2006/0194181 A1 | 8/2006 | Rosenberg |
| 2007/0011011 A1 | 1/2007 | Cogliano |
| 2008/0140413 A1 | 6/2008 | Millman et al. |
| 2010/0028843 A1* | 2/2010 | Currington ............ G09B 5/062 434/317 |
| 2011/0153047 A1* | 6/2011 | Cameron .......... G06F 17/30029 700/94 |
| 2013/0151955 A1* | 6/2013 | Williams ................ G06F 17/24 715/255 |
| 2015/0100320 A1 | 4/2015 | Garbos et al. |
| 2017/0262537 A1 | 9/2017 | Harrison et al. |

* cited by examiner

*Primary Examiner* — Richa Mishra
(74) *Attorney, Agent, or Firm* — Dority & Manning, P.A.

(57) ABSTRACT

Systems, methods, and computer program products relate to special effects for a text source, such as a traditional paper book, e-book, mobile phone text, comic book, or any other form of pre-defined reading material, and for outputting the special effects. The special effects may be played in response to a user reading the text source aloud to enhance their enjoyment of the reading experience and provide interactivity. The special effects can be customized to the particular text source and can be synchronized to initiate the special effect in response to pre-programmed trigger phrases when reading the text source aloud.

18 Claims, 7 Drawing Sheets

SYSTEM AND METHOD FOR INTEGRATING SPECIAL EFFECTS WITH A TEXT SOURCE

FIELD OF THE INVENTION

Embodiments of the present disclosure relate to integrating special effects with a text source, and, in particular, with the reading of a text source.

BACKGROUND OF THE INVENTION

Generation of synchronized music and/or audible effects in combination with silent reading is described in, for example, U.S. Patent Application Publication No. 2011/0153047. Such systems, however, are dependent on use of electronic books and algorithms that synchronize a user's reading speed to the sound effects by use of a learning algorithm that times the sound effects based on the user's reading speed. Further, such systems do not provide an interactive experience, but rather a passive experience, and users complain of the sound effects being distracting when silent reading. Further, such systems are limited to providing audio sound effects.

As such, it would be desirable if there exists a system for integrating special effects for text sources, and providing the special effects in response to a user reading the text source.

BRIEF DESCRIPTION OF THE INVENTION

Embodiments of the present disclosure relate to special effects for a text source, such as a traditional paper book, e-book, website, mobile phone text, comic book, or any other form of pre-defined text, and an associated method and system for playing the special effects. In particular, the special effects may be played in response to a user reading the text source to enhance the enjoyment of their reading experience. The special effects can be customized to the particular text source and can be synchronized to initiate the special effect in response to the text source being read.

In one aspect, a system for providing a special effect associated with an auditory input, can include
 an electronic mobile device configured to:
  receive an audible input from a user comprising speech of a user reading one or more portions of a text source;
  determine whether the audible input matches one or more pre-determined triggers via a speech recognition algorithm; and
  in response to determining that the audible input matches the pre-determined trigger, command a special effect device to output a plurality of special effects associated with the text source;
 wherein the special effect device comprises an audio speaker and a light source, and the at least one of the one or more special effects includes audio content and light emission;
 wherein the plurality of special effects comprises a first special effect and a second special effect, wherein the first special effect and the second special effect are different, and wherein the electronic mobile device is configured to command the special effect output device to output the second special effect at least partially concurrently with outputting the first special effect.

In some embodiments, the text source is pre-existing.
In some embodiments, the text source comprises a book.
In some embodiments, the text source comprises a comic book.

In some embodiments, the text source comprises a printed text source.
In some embodiments, the text source comprises an electronically displayed text source.
In some embodiments, the electronic mobile device is configured to command the special effect device to begin outputting the first special effect before beginning to output the second special effect.
In some embodiments, the electronic mobile device is configured to command the special effect device to stop outputting the first special effect before stopping the output of the second special effect.
In some embodiments, wherein the electronic mobile device is configured to command the special effect device to stop outputting the second special effect before stopping the output of the first special effect.
In some embodiments, wherein the plurality of special effects comprises a first special effect comprising an audio output, a second special effect comprising an audio output, and a third special effect comprising a light emission.
In some embodiments, wherein a first pre-determined trigger causes output of the first special effect and a second pre-determined trigger causes output of the second special effect, wherein the first pre-determined trigger is different than the second pre-determined trigger; and wherein the electronic mobile device is configured to determine when a pre-determined trigger phrase is detected via a speech recognition algorithm at least partly concurrently while outputting the plurality of special effects.
In some embodiments, wherein the electronic mobile device is communicably coupled but physically distinct from at least one of the one or more special effect devices.
In some embodiments, wherein at least one of the plurality of special effects comprises animation.
In some embodiments, at least one of the plurality of special effects comprises video.
In some embodiments, at least one of the plurality of special effects comprises a picture.
In some embodiments, the one or more pre-determined triggers comprise active pre-determined triggers and inactive pre-determined triggers; and in response to determining that the audible input matches an active pre-determined trigger command the system to activate an inactive pre-determined trigger; and, in response to determining that the audible input matches the activated pre-determined trigger, command the special effect device to output one or more special effects.
In some embodiments, the electronic mobile device is configured to deactivate at least one of the active pre-determined trigger phrases after detection of the at least one of the plurality of pre-determined trigger phrases such that a user subsequently reading the at least one of the plurality of pre-determined trigger phrases after detection of the at least one of the plurality of pre-determined trigger phrases does not result in commanding the special effect output device to output a special effect.
In some embodiments, the audible input from a user comprising speech of a user reading one or more portions of a text source is pre-recorded and electronically outputted.

In another aspect, a system for providing a special effect associated with an auditory input, can include
 an electronic mobile device configured to:
  receive an audible input from a user comprising speech of a user reading one or more portions of a text source;
  determine whether the audible input matches one or more pre-determined triggers via a speech recognition algorithm, wherein the one or more pre-determined triggers comprise active pre-determined triggers and inactive pre-determined triggers; and in response to determining that the audible input matches at least one of the one or more pre-determined triggers, command one or more special effect devices to output a plurality of special effects associated with the text source and in response to determining that the audible input matches an active pre-determined trigger command the system to activate an inactive pre-determined trigger;

wherein the one or more special effect device comprises an audio speaker and a light source, and the at least one of the one or more special effects includes audio content and light emission; wherein the plurality of special effects comprises a first special effect comprising an audio output, a second special effect comprising an audio output different from the first special effect, and a third special effect comprising a light emission;

wherein the electronic mobile device is configured to command the special effect output device to output the second special effect and/or the third special effect at least partially concurrently with outputting the first special effect;

wherein a first pre-determined trigger causes output of the first special effect and a second pre-determined trigger causes output of the second special effect and a third pre-determined trigger causes output of the third special effect, wherein the first pre-determined trigger is at least partly different than the second pre-determined trigger; and wherein the electronic mobile device is configured to determine when a pre-determined trigger phrase is detected via a speech recognition algorithm at least partly concurrently while outputting the plurality of special effects.

In yet another aspect, a system for providing a special effect associated with an auditory input can include an electronic mobile device configured to:

receive an audible input from a user comprising speech of a user reading one or more portions of a text source, wherein the text source comprises a printed book;

determine whether the audible input matches one or more pre-determined triggers via a speech recognition algorithm; and in response to determining that the audible input matches the pre-determined trigger, command one or more special effect devices to output a plurality of special effects associated with the text source;

wherein the one or more special effect device comprises an audio speaker and a light source, and the at least one of the one or more special effects includes audio content and light emission; wherein the plurality of special effects comprises a first special effect comprising an audio output, a second special effect comprising an audio output different from the first special effect, and a third special effect comprising a light emission;

wherein the electronic mobile device is configured to command the special effect output device to output the second special effect and/or the third special effect at least partially concurrently with outputting the first special effect;

wherein a first pre-determined trigger causes output of the first special effect and a second pre-determined trigger causes output of the second special effect and a third pre-determined trigger causes output of the third special effect, wherein the first pre-determined trigger is at least partly different than the second pre-determined trigger; and wherein the electronic mobile device is configured to determine when a pre-determined trigger phrase is detected via a speech recognition algorithm at least partly concurrently while outputting the plurality of special effects.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
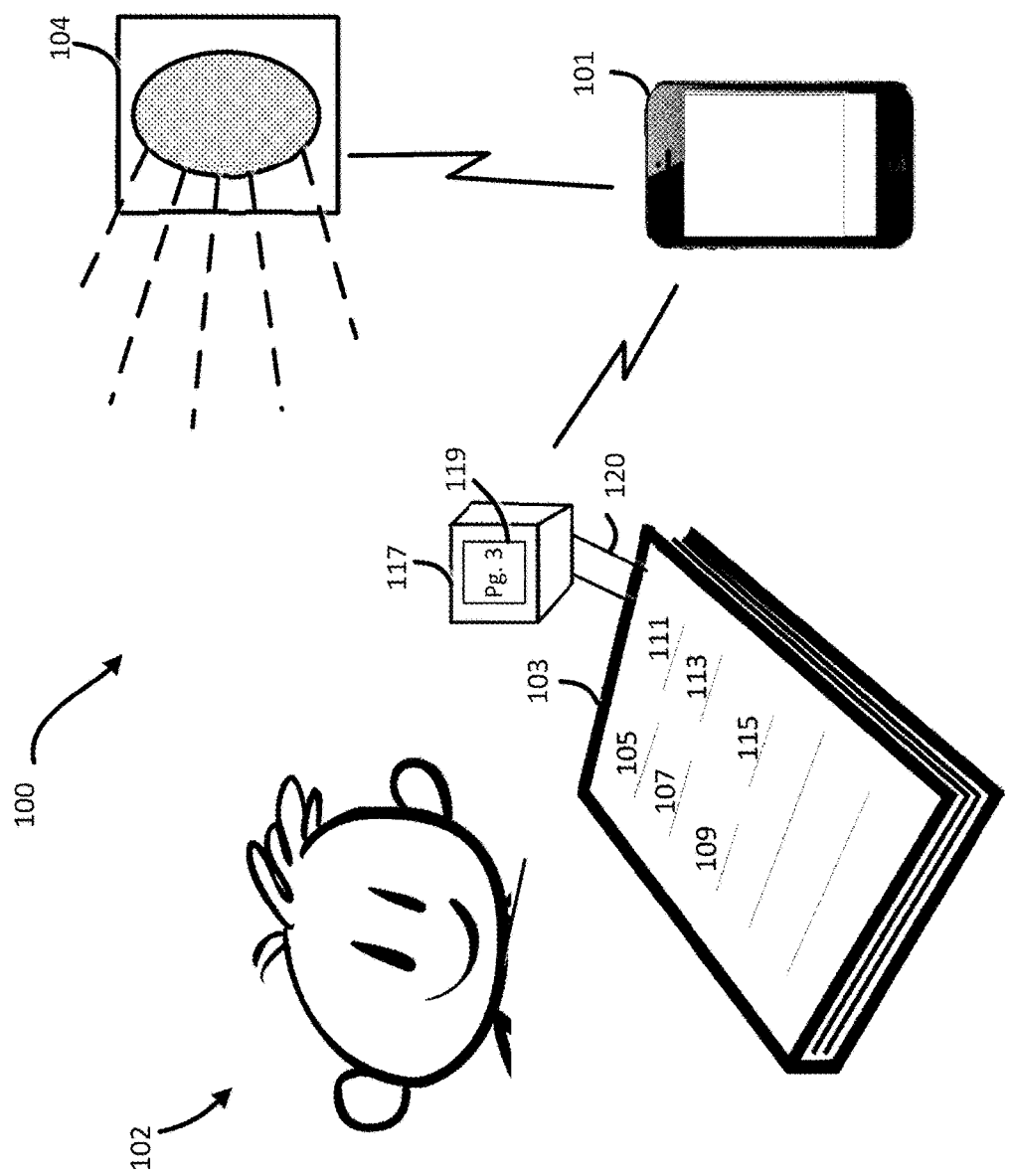
FIG. 1 is a general overview of a system according to an embodiment of the present disclosure.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

A reader's experience may be enhanced if, while reading a text source, special effects, such as, for example, audio sounds, music, lighting, fans, vibrations, air changes, temperature changes, other environmental effects and the like, are triggered in synchronization when specific words or phrases of the text source are read.

For example, a system may be configured to detect, via a speech recognition module, a particular pre-determined word or phrase of a text source, process, and output a special effect related to one or more portions (e.g., feature words) of the text source.

As another example, a system may be configured to detect or estimate the reader's position in a book through an estimation of a reading speed or through eye tracking.

Certain embodiments of the present disclosure can synchronize special effects and compensate for a time delay by including a system programmed to begin processing and outputting a special effect related to the feature word prior to the feature word being read by the reader. As a result, there may appear to be no delay between the time the feature word is read by reader, and the initiation of the special effect related to the feature word. Stated differently, the special effect related to the feature word may be initiated generally simultaneously to the reader reading the feature word, providing an enjoyable "real-time" enhanced reading experience.

Referring now to FIG. 1, a system 100 for generation of a special effect according to an embodiment of the disclosure is shown. In the system 100, an electronic device 101 may be used (such as by a reader 102) in conjunction with a text source 103, and one or more special effect modules 104.

The text source 103 may refer to any pre-defined text, such as, for example, a book such as a children's book, a board book, a chapter book, a novel, a magazine, a comic book, and the like; a script such as a manuscript, a script for a play, movie, and the like; a text message; electronic text, such as text displayed on, for example, a computer, a mobile device, a television, or any other electronic display device.

In particular embodiments, the text source 103 can be a traditional printed text, also referred to herein as a physical text source. In other particular embodiments, the text source 103 can be electronically displayed text, also referred to herein as an electronic text source.

In certain embodiments, the text source 103 can be a pre-existing text source. For example, in certain embodiments, the special effects can be correlated to the text source long after creation of the text source. In this way, special effects can be correlated to any pre-existing text sources including, but not limited to, text printed days, weeks, months, years, or even centuries ago. Thus, no redistribution of the text source with the system 100 is required to provide correlated special effects to the text source.

The text source 103 may include one or more words, or strings of characters, some of which can be trigger phrases, such as trigger phrases 105, 107, 109, and so on. A trigger phrase 105, 107, 109 may refer to one or more words, or string(s) of characters, programmed to elicit one or more responses from one or more components of the electronic device 101. The text source 103 may also include one or more feature phrases 111, 113, 115 which may refer to one or more words or phrases to which a special effect may be related.

As discussed above, it may be desirable to have a particular special effect played generally simultaneous to the feature phrase being read and/or spoken. The system 100 may be programmed to command one or more of the special effect output modules 104 to play the special effect upon detection of one or more trigger phrases 105, 107, 109. Therefore, by the time the processing of the command is complete and an actual special effect is output, the reader may be simultaneously reading the feature phrase 111, 113, 115 to which the special effect is related. As such, the system 100 may be programmed to synchronize playback of a desired special effect generally simultaneously with the feature phrase 111, 113, 115 being read by initiating playback of the special effect when one or more trigger phrases 105, 107, 109 are detected. In this context, it is to be understood that "generally simultaneously" refers to immediately before, during, and/or immediately after the feature phrase is being read.

In certain embodiments, at least one of the words in a feature phrase 111, 113, 115 can be the same as at least one of the words in a trigger phrase 105, 107, 109. In other embodiments, no words can overlap between a feature phrase 111, 113, 115 and a trigger phrase 105, 107, 109.

In further embodiments, the trigger phrase 105, 107, 109 can text be designed to be read before the feature phrase 111, 113, 115.

Figure 2:
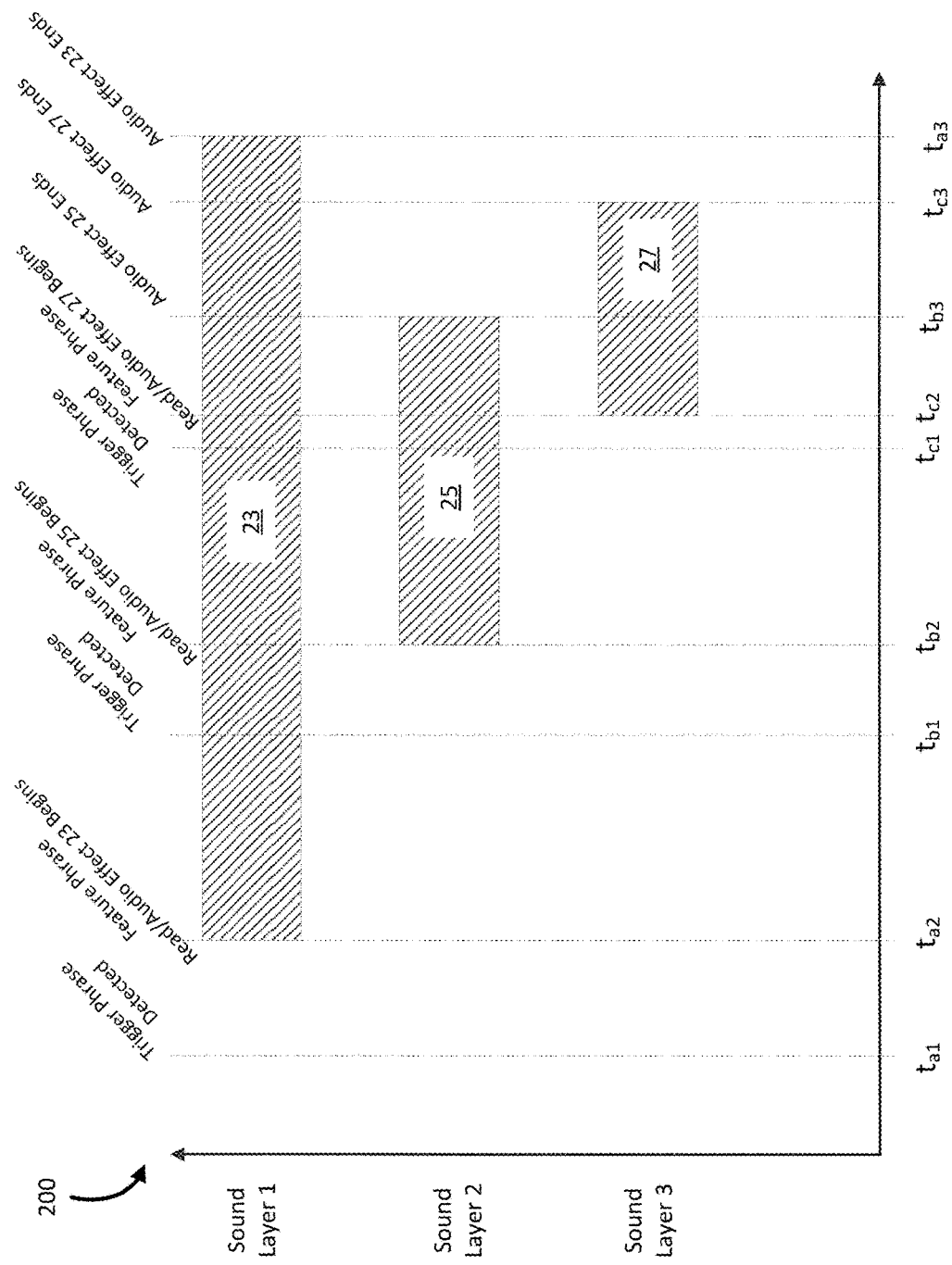
FIG. 2 is a schematic representation of operation of a soundtrack according to am embodiment of the present disclosure.

With reference to FIG. 2, a schematic representation of a portion of a special effect track 200 for a text source 103 is shown. The special effect track 200 may be multi-layered comprising one or more special effects that may play separate or concurrently during reading of the text source 103. Each special effect layer may include one or more special effects. By way of example, three special effect layers are shown, although it will be appreciated that any number of layers could be provided in other forms of the text source profile. Each of the special effect layers 1, 2, and 3 may represent any type of special effect, including but not limited to an auditory effect, a visual effect, an environmental effect, other special effects, and combinations thereof.

The system 100 may optionally include a second electronic device 117 which may include a microphone or other type of audio detector capable of detecting audio. The second electronic device 117 may communicate the detected audio to the electronic device 101, via any communication method described hereinthroughout, which may include, but is not limited to: bluetooth, WI-FI, ZIGBEE, and the like. The second electronic device 117 may also take the form of a bookmark. As such, the electronic device 117 may include a page marking mechanism 119 that is adapted to identify to a user the current page on the book if reading has stopped part way through the book. The second electronic device may include an engagement mechanism 120 that is adapted to secure the second electronic device 117 to the text source 103. As shown, the second electronic device 117 is attached to the text source 103. It should be noted, however, that the second electronic device 117 may be attached to other elements, such as, for example, the reader 102, or any object.

In certain embodiments, auditory effects can include atmospheric noise, background music, theme music, human voices, animal sounds, sound effects and the like. For example, atmospheric noise may refer to weather sounds, scene noise, and like. Background music may refer to orchestral music, songs, or any other musical sounds. Other audible effects may refer to animal sounds, human voices, doors shutting, and the like, that are programmed to play upon detection of a trigger phrase.

In certain embodiments, visual effects can include any special effect that is designed to be viewable by an active and/or passive user. For example, visual effects can include visual information on an electronic display such as a computer, a mobile device, a television, a laser, a holographic display, and the like. Further, visual effects can include animation, video, or other forms of motion. Still further, visual effects can include other light sources such as a lamp, a flashlight, such as a flashlight on a mobile device, car lights, Christmas lights, laser lights, and the like.

As used herein, the phrase "environmental special effect" refers to a special effect which affects the user's sense of touch, sense of smell, or combinations thereof. For example, an environmental special effect can include fog generated by a fog machine; wind generated by a fan; vibrations generated by a massaging chair; physical movements of a user generated by a movable device, for example a wheel chair; and the like.

As used herein, an environmental special effect does not refer solely to auditory special effects such as sound effect, music and the like. Further, as used herein, an environmental special effect does not refer solely to a visual special effect.

Moreover, as used herein, an environmental special effect does not refer solely to a combination of an auditory special effect and a visual special effect.

As shown in the example soundtrack depicted in FIG. 2, upon trigger time ta1, special effect 23 of special effect layer 1 may be programmed to begin playback at time ta2 (e.g., an approximate time the reader may read a feature phrase) and to end playback at time ta3. At time tb1, special effect effect 25 of special effect layer 2 may be programmed to begin playback at time tb2 and to end playback at time tb3. Similarly, upon trigger time tc1, special effect effect 27 of layer 3 may be programmed to begin playback at time tc2 and end playback at time tc3.

Trigger times ta1, tb1, tc1 correspond to triggers for respective special effect layers 1, 2, and 3. A trigger time ta1, tb1, or tc1 may correspond to a time when the system detects a trigger phrase. Each special effect may be configured to play for any desired length of time, which may be based on one or more various factors. For example, with respect to a special effect of one of the special effect layers (e.g., special effect 23 of layer 1), playback end time ta3 may correspond to detection of another trigger phrase of layer 1, playback of another special effect of layer 1 or detection of another trigger phrase or playback of another special effect of different layer (e.g., layer 2 and/or layer 3). Alternatively, or additionally, a special effect may be programmed to play for a predetermined duration of time. For example, each special effect may be configured to play for 3 seconds. As such, for special effect layer 1, ta3 may refer to a time 3 seconds after ta2. As another alternative, each special effect may be configured to play for a random duration of time (e.g. through the use of a random number generator to randomly generate a time duration for one or more of the audio effects, as a part of the system 100).

Figure 3:
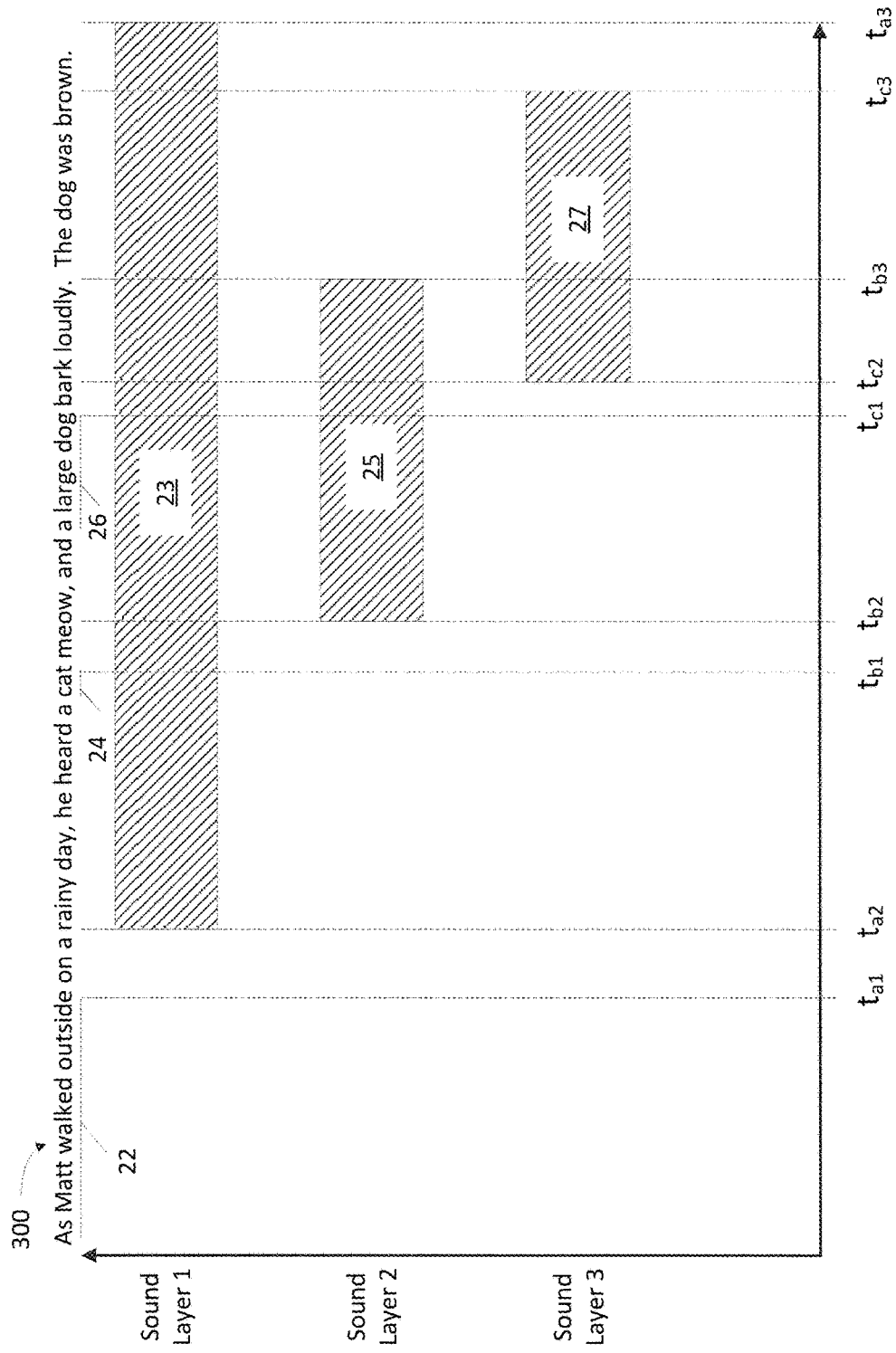
FIG. 3 is a specific example of a soundtrack associated with a text source according to an embodiment of the present disclosure.
Figure 4:
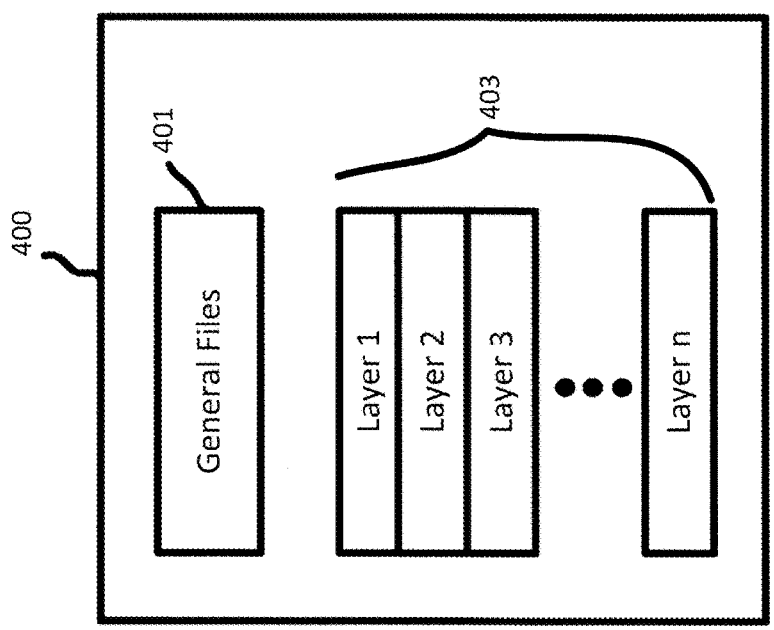
FIG. 4 is a block diagram illustrating an arrangement of soundtrack files associating with one or more text sources according to an embodiment of the present disclosure.

FIG. 3 is a specific example operation of a special effect track for a text source 300. For the sake of simplicity, the text source 300 consists of only two sentences. It should be appreciated, however, that the text source 300 may be of any length. It should also be noted that the trigger phrases may be of any desired length. The trigger phrase 22 may be denoted as the sequence of words "[a]s matt walked outside". The system 100 may detect this trigger phrase at time ta1, and, at time ta2 (corresponding to an approximate time when the reader may speak the feature phrase "rainy"), with respect to special effect layer 1, play special effect 23 comprising weather sounds such as rain drops hitting the ground. Therefore, any processing necessary to output a special effect of rainy weather may be performed prior to the reader actually reading the feature phrase "rainy". As a result, the system 100 is able to play the rainy weather sounds generally simultaneously to the reader reading the feature phrase rainy, providing an enjoyable "real-time" enhanced reading experience.

Another trigger phrase 24 may be the word "cat." The system 100 may detect this trigger phrase at time tb1, and, at time tb2, corresponding to an approximate time the reader may be reading the feature phrase "cat," play the special effect 25 comprising a loop of a sound of a cat's meow. Therefore, any system processing necessary to output sounds of cat meowing may be performed prior to the reader actually reading the feature phrase "meow." As a result, the system 100 is able to play the special effect 25 of a cat's meow generally simultaneously to the reader reading the feature word "meow."

With respect to special effect layer 3, another trigger phrase 26 of the text source 30 may be the sequence of words "and a large dog." The system 100 may detect this trigger phrase at time tc1, and begin playback of the special effect 27 at time tc2. Therefore, any processing necessary to output sounds of a dog barking may be performed prior to the reader actually reading the feature phrase "bark". As a result, the system 100 is able to play the special effect 27 of a dog barking generally simultaneously to the reader reading the feature word "bark", providing an enjoyable "real-time" enhanced reading experience.

At least because of the multi-layer nature of the special effect track, according to this example, for a period of time, a reader is able to experience the special effects of rain hitting the ground, a cat meowing, and a dog barking concurrently.

Continuing with this example, the special effect 23 (e.g., the sound of rain hitting the ground) may be programmed to end playback at time ta3. Similarly, the sound of the cat's meowing may be programmed to end at tb3, and the dog's barking may be programmed to end at tc3. It should be noted that one or more layers of the special effect track may also be "pre-mixed." For example, in response to detection of a single trigger phrase, one or more special effects of special effect layer 1 may be pre-programmed to play for a pre-determined period of time, one or more special effects of special effect layer 2 may be pre-programmed to begin playback after a pre-determined time of the playback of one or more effects of special effect layer 1, and one or more audible effects of special effect layer 3 may be pre-programmed to begin playback after a pre-determined time after the playback of one or more special effects of layers 1 and/or 2. The pre-mixed special effect track may be based on an average reading speed, which may be updated (e.g., sped up or slowed down), at any given time by an operator of the system. Further, the system 100 may be able to detect and modify the pre-mixed special effect tracks based on user's reading speed ascertained by the system 100.

It should be appreciated that the special effect track may be packaged into various file formats and arrangements for interpretation and playing by corresponding special effect software running on a special effect player. By way of example only, the special effect track may comprise a package of special effect files 400. The special effect files 400 may include a general data file 401 and one or more layer files 403 corresponding to each of the special effect layers of a special effect track for one or more text sources 103. It will be appreciated that that the special effect track may alternatively comprise only the data files 401, 403 and that the layer files may be retrieved from a database or memory during playing of one or more special effects of one or more layers of the text source special effect profile, and, in such forms, one or more of the data files 401, 403 may contain linking or file path information for retrieving the special effect files from memory, a database, or over a network.

The general data file 401 may comprise general profile data such as, but not limited to, the name of the special effect track, the name of the text source with which the profile is associated, and any other identification or necessary special effect information or profile information. The general data file 401 may also comprise reading speed data, which may include average reading speed data duration of the overall text source profile. Additionally, the general data file 401 may include layer data comprising information about the number of special effect layers in the text source profile and names of the respective special effect layers. The layer data may also include filenames, file paths, or links to the corresponding layer data file 403 of each of the special effect layers.

Each layer file 403 may include special effects, which may include one or more special effects for each layer, and the trigger phrase associated with each of the one or more special effects for each layer. The layer file 403 may also provide information on the particular special effect features associated with the one or more special effects of the respective special effect layer. For example, any predetermined durations of time of which one or more special effects is set to play, and optionally, other special effect feature properties, such as, for example, transition effects, such as fade-in, fade-out times, volume, looping, and the like.

It should be appreciated that the above description of the special effect files 400 is by way of non-limiting example only. As such, data and special effects needed for creation and operation of embodiments of the disclosure may be stored in any combination of files. For example, one or more layer files 403 may be included in the general file 401, and vice versa.

In certain embodiments, a library of trigger phrases can be arranged in a plurality of discrete databases. For example, a text source, such as a book, can include, 100 pages of text including 10 chapters. Each chapter can have a discrete database of pre-programmed trigger phrases. Further, at least one trigger phrase can, instead of or in addition to initiating a special effect, can initiate the system to access a different database of trigger phrases for subsequent text that is read, also referred to herein as a database transition trigger phrase. By way of non-limiting example only, while reading from chapter 1 (to which system 100 may include a corresponding database) of a book, the reader may read a trigger phrase, which may cause the system 100 to output a special effect, and, additionally prompt the system 100 to access another database corresponding to another chapter (e.g., chapter 2). Alternatively, upon reception of the trigger phrase, the system 100 may not output a special effect, but simply be prompted to switch to another database. It should be noted that databases may correspond to other portions of text sources in keeping with the invention. For example, a single chapter of a text source may include multiple databases. Also, databases may simply correspond to different portions of a text source that has no designated chapters.

In other embodiments, essentially all of the trigger phrases can be included in a single database. In some embodiments, the system 100 may include functionality to operate with different languages. For example, a first database may include pre-determined trigger phrases of one or more different languages, which, as used herein may refer to dialects, speech patterns, and the like. Therefore, in operation, one or more processors of the electronic device may be configured to access the first database. The system 100 may detect, for example, via a speech algorithm, the language of the detected pre-determined trigger phrase. Based on the detected pre-determined trigger phrase of the first database, the system may access a second database which may include a plurality of pre-determined trigger phrases which may be the same language as the detected pre-determined trigger phrase of the first database. And, in response to determined that at least one of the pre-determined trigger phrases of the second database is detected, the system 100 may command a special effect output device to play a special effect. It should be noted that the system 100 may include functionality to operate with any number of languages and databases.

In some embodiments, a text source having a plurality of trigger phrases may have different active trigger phrases at given times. For example, at one point in time or portion of reading of the text source, a first group of trigger phrases may be active (e.g., set to effect an action by the system upon being matched to the auditory input of the text source). At another point in time or portion of reading of the text source, a second group of trigger phrases may be active. The group of trigger phrases that are active may be referred to as a window, which may change as subsequent words, or trigger phrases of the text source are read.

For example, a text source may contain words 1-15, and, for the sake of simplicity, in this example, a trigger word or phrase corresponds to each word of the text source. At one point in time, active trigger word which may correspond to words 1-5, respectively, while triggers corresponding to words 6-15 may currently be inactive. However, after word "1" is spoken, the window of active trigger word may "slide." As such, triggers for words 2-6 may now become active, and word "1" now becomes inactive. After trigger word "2" is spoken, the window may again slide so that words 3-7 are active, while words "1" and "2" become inactive, and so on. It should be noted that the designation of active vs. inactive triggers need not be sequential. For example, triggers may become active or inactive randomly, or by user, or other means of designation.

In some embodiments, the system 100 may command the output of special effects related to a location remote from the general location of the text source. Such an output of the special effects may be based, at least in part, on sensory information. The sensory information may include auditory information, visual information, environmental information, or any combination thereof, of the remote location.

For example, one or more special effect tracks may comprise live feeds (e.g., live audio stream) associated with one or more text sources. For example, a text source may contain content about the sights and sounds of New York City. One or more portions of a special effect track associated with the text source may be configured to have one or more trigger phrases that elicit one or more special effects in the form of actual live content, such as audio, video, or environmental effects from sites or locations around New York City. Such sites may have microphones, cameras, sensors, such as temperature sensors, humidity sensors, wind speed sensors, etc. coupled to a network to allow for communication with other components of the system 100 to pick up the live feeds and play the same through the electronic device 101 and/or one or more special effect devices.

Figure 5:
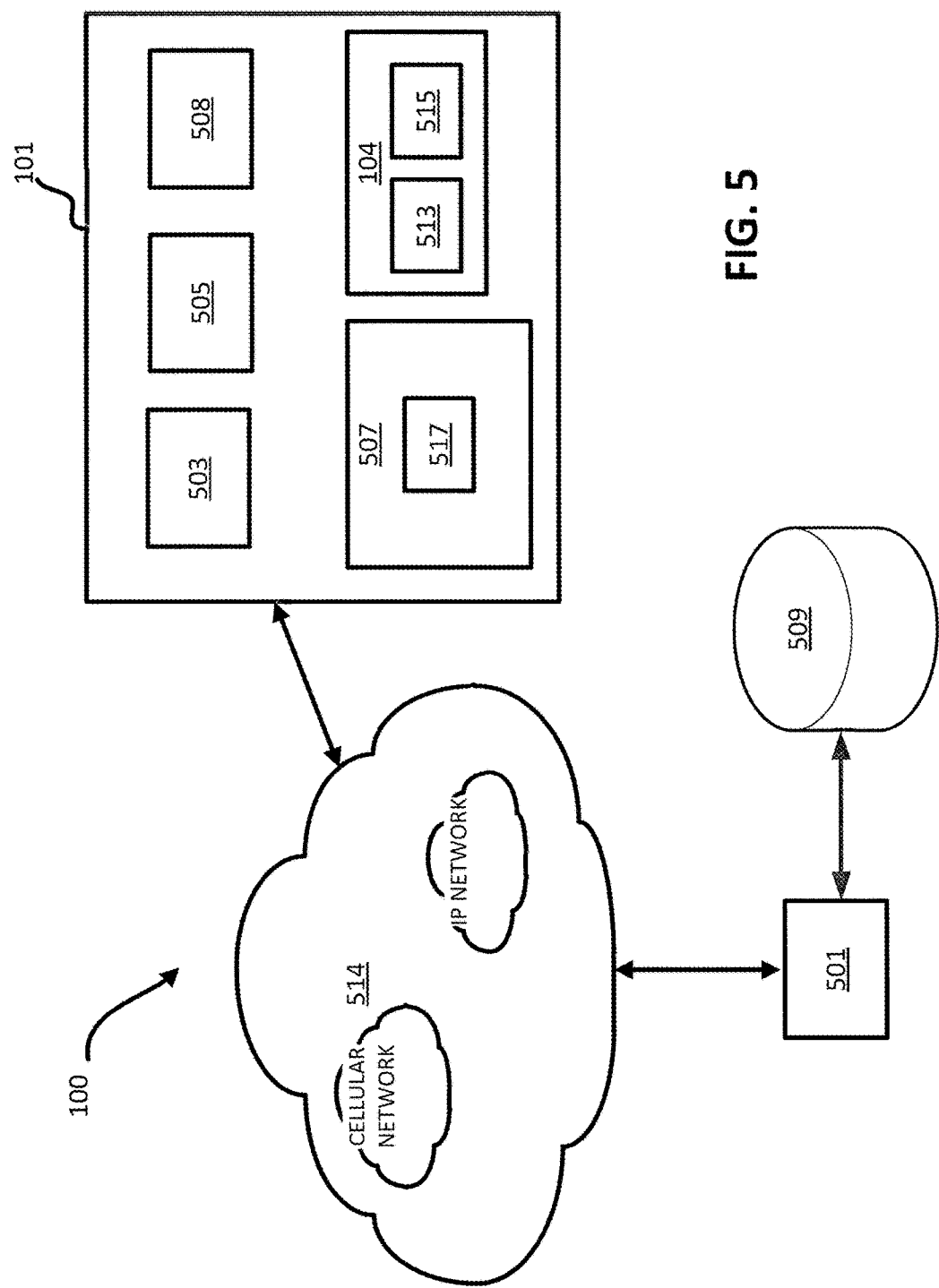
FIG. 5 is a block diagram illustrating components of the electronic device, and their interaction with other components of the system according to an embodiment of the present disclosure.

FIG. 5 is a perspective block diagram of some of the components of the system 100. The system 100 may include a server 501 and the electronic device 101 (as discussed above), which may include an input unit 503, a processor 505, a speech recognition module 507, a memory 508, a database 509, and one or more special effect output modules, such as audio output module 104 which is adapted to produce an auditory special effect. The database 509 may include one or more special effect track files associated with respective text sources (such as, for example, the aforediscussed special effect track files 400).

The audio output module 104 may include a speaker 513, a sound controller 515, and various related circuitry (not shown), which may work with the sound controller 515 to activate the speaker 513 and to play audio effects stored in the database 509 or locally in the memory 508 in a manner known to one of ordinary skill in the art. The processor 505 may be used by the audio output module 104 and/or related circuitry to play the audio effects stored in the memory 508 and/or the database 509. Alternatively, this functionality may be performed solely by the related circuitry and the sound controller 515.

The speech recognition module 507 may include a speech recognition controller 517, and other related circuitry (not shown). The input unit 503 may include a microphone or other sound receiving device (e.g., any device that converts sound into an electrical signal). The speech recognition controller 517 may include, for example, an integrated circuit having a processor (not shown). The input unit 503, speech recognition controller 517, and the other related circuitry, may be configured to work together to receive and detect audible messages from a user (e.g., reader) or other sound source (not shown). For example, the speech recognition module 507 may be configured to receive audible sounds from a reader or other source, such as an audio recording, and to analyze the received audible sounds to detect trigger phrases. Based upon the detected trigger phrase (or each detected sequence of trigger phrase(s)), an appropriate response (e.g., special effect) may be initiated. For example, for each detected trigger phrase, a corresponding special effect may be stored in the memory 508 or the database 509. The speech recognition module 507 may employ at least one speech recognition algorithm that relies, at least in part, on laws of speech or other available data (e.g., heuristics) to identify and detect trigger phrases, whether spoken by an adult, child, or electronically delivered audio, such as from a movie, a TV show, radio, telephone, and the like.

It should be noted that, in light of embodiments of the disclosure herein, one of ordinary skill in the art may appreciate that the speech recognition module 507 may be configured to receive incoming audible sounds or messages and compare the incoming audible sounds to expected phonemes stored in the speech recognition controller 517, memory 508, or the database 509. For example, the speech recognition module 507 may parse received speech into its constituent phonemes and compare these constituents against those constituent phonemes of one or more trigger phrases. When a sufficient number of phonemes match between the received audible sounds and the trigger phrase(s), a match is recorded. In further embodiments, the speech recognition module 507 may be configured to receive incoming audible sounds or messages and derive a score relating to the confidence of detection of one or more pre-programed trigger phrases. When there is a match (or high enough score), the speech recognition module 507, potentially by the speech recognition controller 517 or the other related circuitry activates the correlated special effect.

A reader's experience may further be enhanced through periodic or sporadic updates, changes, and/or other special effect track alterations. For example, according to embodiments of the present disclosure, operators may be able to access the server 501 to provide additional special effect tracks, add, or otherwise modify existing special effect tracks to text sources. A user or reader of a text source may then download or otherwise obtain the updated special effect track for a selected text source. As such, the reader may experience different special effects than a previous time the user has read the text source. One or more of the special effect tracks may be modified in other ways as well, adding to the dynamic capabilities of embodiments discussed herein. For example, trigger words of a special effect track may be changed, added, removed, or otherwise modified for the same text source. The special effect track may also be modified by changing a special effect elicited by the same trigger word. Such modifications can be performed remotely by an operator, such as via the server 501 and the database 509.

Modifications can also be performed through implementation of a random number generator associated with the system 100. For example, the random number generator may seemingly randomly generate numbers corresponding to one or more trigger words to be used with the text source, a particular special effect to be used in response to a trigger word, and any other aspect of the special effect track to provide the reader or user with a potentially different experience. As another example, the aforediscussed modifications of trigger phrases, sounds, and the like can be effected through a pre-programmed sequence. For example, the first time the text source is read, one set of trigger words are used, the second time, another set is used, and a subsequent time, another set is used, and so on. Further, special effects can be programmed to sequentially change as well. Even still, any other aspect or combination of the came can be programmed to be sequentially modified. Accordingly, different experiences can be had each time a text source is read.

In some embodiments, the electronic device 101, for example, via a speech recognition algorithm, listen for trigger phrases output by sources other than the user, such as, for example, a TV show, a movie, radio, internet content, and the like). Upon reception of a matched trigger phrase, associated content may be displayed on the electronic device 101. For example, a user may be watching television, and a BMW commercial plays. The system 100 may have a pre-determined trigger phrase for detection of a portion of the BMW commercial. When the system 100 detects the phrase from the BMW commercial, associated content (e.g., an associated advertisement) from BMW may appear on the electronic device 101. Further, the user may click, or otherwise select the advertisement from the electronic device 101 and receive more content pertaining to BMW.

In some embodiments, the speaker 513 may be distanced, or otherwise decoupled from the microphone. For example, the speaker 513 may be communicably coupled to the electronic device via a bluetooth, NFC, or any other wireless or wired means capable of allowing for communication between the speaker 513 and the microphone. Such a configuration may ensure the microphone of the system 100 picks up audible messages spoken by the reader and not audible effects output by the speaker 513. The system 100 may also employ one or more filters to filter or otherwise block the output audible effects from the speaker 513. Such filtering may be possible due at least in part to the fact that the system 100 knows which audible effects are currently being output. As such, one or more filters knows exactly what audible sounds need to be filtered.

The system 100 may include a communication network 514 which operatively couples the electronic device 101, the server 501, and the database 509. The communication network 514 may include any suitable circuitry, device, system, or combination of these (e.g., a wireless or hardline communications infrastructure including towers and communications servers, an IP network, and the like) operative to create the communication network 514. The communication network 514 can provide for communications in accordance with any wired or wireless communication standard. For example, the communication network 514 can provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD- SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, the communication network 514 may be configured to provide for communications in accordance with techniques such as, for example, radio frequency (RF), infrared, or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth™, ultra wideband (UWB) and/or the like.

The electronic device 101 may refer to, without limitation, one or more personal computers, laptop computers, personal media devices, display devices, video gaming systems, gaming consoles, cameras, video cameras, MP3 players, mobile devices, wearable devices (e.g., iWatch by Apple, Inc.), mobile telephones, cellular telephones, GPS navigation devices, smartphones, tablet computers, portable video players, satellite media players, satellite telephones, wireless communications devices, or personal digital assistants (PDA). The electronic device may also refer to one or more components of a home automation system, appliance, and the like, such as AMAZON ECHO. It should be appreciated that the electronic device may refer to other entities different from a toy such as a doll, or a book.

In the description hereinthroughout, the term "app" or "application" or "mobile app" may refer to, for example, an executable binary that is installed and runs on a computing device, or a web site that the user navigates to within a web browser on the computing device, or a combination of them. An "app" may also refer to multiple executable binaries that work in conjunction on a computing device to perform one or more functions. It should be noted that one or more of the above components (e.g., the processor, the speech recognition module 507) may be operated in conjunction with the app as a part of the system 100.

The various illustrative logical blocks and modules described herein may be implemented or performed with a general-purpose processor, an application specific integrated circuit, (ASIC) a digital signal processor, a field programmable gate array (FPGA) or other programmable logic device, discrete gate or transistor logic, discrete hardware components, or any combination thereof. A general-purpose processor may be a microprocessor, but in the alternative, the processor may be any conventional processor, controller, microcontroller, or state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device. In the alternative, the processor and the storage medium may reside as discrete components in a computing device.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
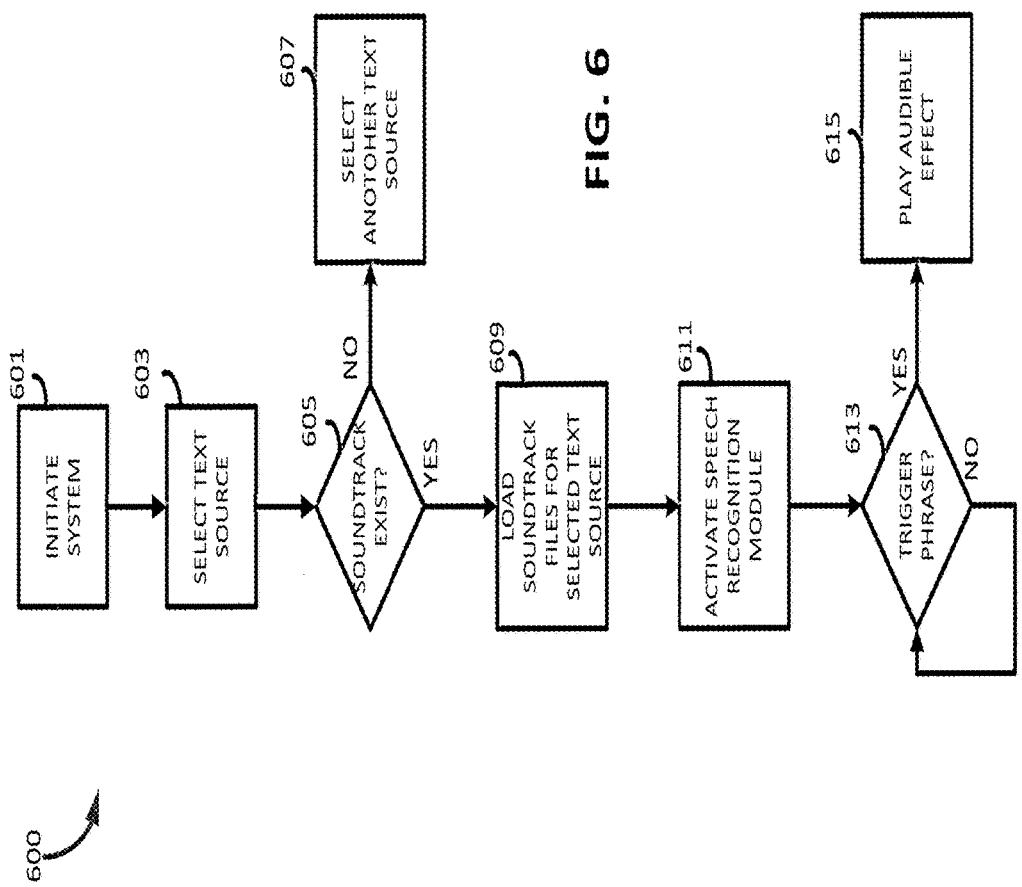
FIG. 6 is a example flow chart depicting a method of operation of playing sound effects associating with a text source according to embodiments of the present disclosure.

FIG. 6 is an example flow diagram 600 illustrating operation of one of the embodiments of the present disclosure. At block 601, a user may initiate the special effect system 100. Such initiation may take the form of logging onto an associated application on the electronic device 101. After initiation of the system 100, at block 603, the user may identify a text source she wishes to read aloud. Identification of the text source may be performed by the user entering a title of a text source, browsing for a text source title, or audibly speaking the name of a text source title. Also using the electronic device 101, the user may read a bar code, QR code, or other unique identifying mark on a text source, the title of which may be extracted therefrom, for use with the app. At block 605, the system 100 (e.g., the server 501 or an application running locally) may check if a special effect track exists for the selected text source. If no soundtrack exists, at block 607, the system 100 (e.g., the server 501 or an application running locally) may prompt the user to select another text source for reading. This process may repeat until a text source is selected for which there exists a special effect track, at which time the process continues to block 609. At block 609, one or more special effect track files associated with the selected text source may be loaded onto the electronic device. One of more of the special effect track files may be downloaded (e.g., from the database 509 via the server or the memory 508) to the electronic device 101 (e.g., onto the memory 508). Alternatively, one or more special effect track files, or any portion thereof, may be retrieved from the database via server 501 during reading of the selected text source.

At block 611, the speech recognition module 507 may be activated to receive audible input from the reader, via the microphone of the input unit 503. At block 613, the application continuously picks up on audible messages, checks the audible input for matches to one or more trigger phrases. Such a check may include comparing the spoken word(s) to word searchable files having an associated audio effect or soundtrack. In further embodiments, such a check may include comparing the spoken word(s) to a database of pre-programmed trigger phrases and delivering a numerical confidence score of a keyword being detected. Upon detection (or a score high enough to count as a detection), at block 615, the system 100 plays the special effect associated with the detected one or more trigger phrases. The system 100 continues to listen for audible messages continuously during playing of the special effect(s). The system 100 continues to listen for audible messages until the end of the text source is reached, another text source is loaded, or the system 100 is deactivated.

Figure 7:
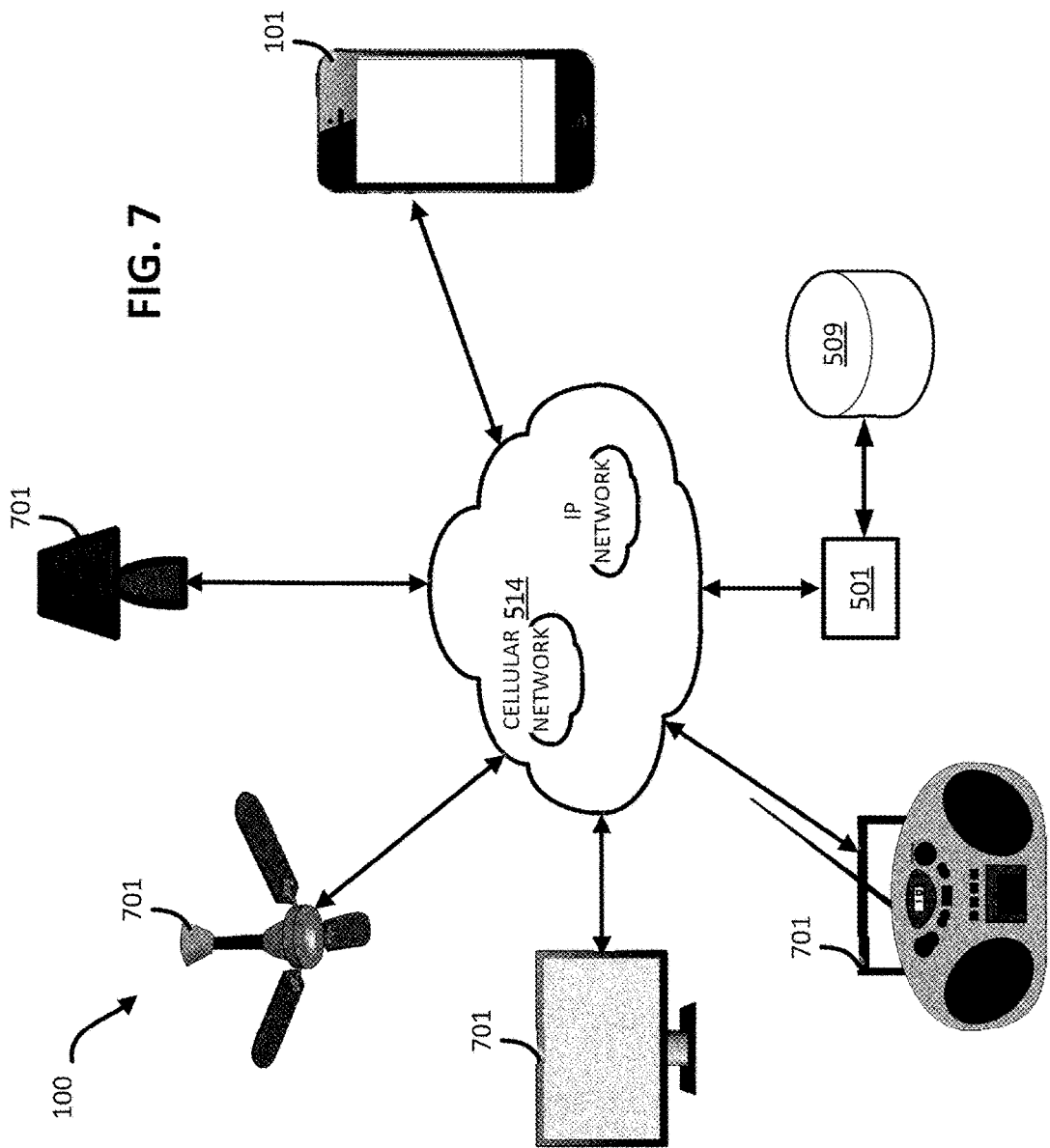
FIG. 7 is a diagram illustrating various connected devices.

It should be appreciated that other embodiments are contemplated. For example, one or more components of the system 100 may be employed for integration with movie or other media content. For example, the system 100 may be programmed to output special effects in response to audible messages from currently playing media content. These effects may be audible or other forms depending on other connected devices. For example, and as reflected in FIG. 7, the system 100 may be programmed to queue one or more special effects generated by one or more internet of things (IoT) devices 701 which may be embedded with electronics, software, and/or sensors with network connectivity, which may enable the objects to collect and exchange data. For example, these IoT devices 701 may potentially be associated with home automation which may include but are not limited to lights, fans, garage doors, alarm systems, heating and cooling systems, doorbells, microwaves, and refrigerators, that may allow the system 100 to access, control, and/or configure the same to generate a special effect or prompt another IoT device to generate a special effect.

Similar to the above discussed creation of special effect tracks for text sources, operators may create special effect tracks customized for any movie or other media content. Such interactively with home devices may operate both ways. For example, in response to one or more special effects output by the aforediscussed home devices, media content played from (e.g., a video player), may be controlled (e.g., paused, sped up, slowed down, skipped through, changed) directly through such home devices. Accordingly, one or more embodiments of the present disclosure allow for the communication of objects, animals, people, and the like (e.g., through a network) without human-to-human or human-to-computer interaction.

Embodiments of the present disclosure may also allow for the communication of any of the afore-discussed devices through use of pre-defined audio sources. For example, operators of the system 100 may program audio sources to configure a connected device to operate in a desired manner. The pre-defined audio may be any content, such as television, radio, audiobook, music, and the like. Any connected device within a distance capable of detecting audio from pre-defined audio source can communicate and interact in a predetermined manner.

Certain embodiments of the present disclosure may also relate to advertising. For example, a person may be watching programming (e.g., on a television) and a car advertisement is played. The person may have an electronic device in close proximity. As such, the electronic device (e.g., speech recognition module) may detect the car advertisement through, for example, pre-programmed trigger words that are played during the advertisement. Consequently, the system may be configured to detect that the user is listening to the advertisement in real time. Further, the system may be configured to present (on the electronic device) corollary content, such as another advertisement or other media related to the detected car advertisement that was displayed on the television.

Further, certain embodiments of the present disclosure may relate to data analytics allowing a user of an electronic device to ascertain information about other users and associated electronic device through use of the aforediscussed system. For example, the system may be configured to determine if and when a user has been within an audible distance of an advertisement as discussed above. Such a system can have the words played in the advertisement pre-programmed as trigger words, and thereby determine if and when the trigger words are detected thus signaling that a user has heard the advertisement.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

One example aspect is directed to a system for providing a special effect with an auditory input. The system comprises of an electronic device. The electronic device is configured to receive an audible input from a user, determine whether the audible input matches a pre-determined trigger, and if the audible input matches the pre-determined trigger, command a special effect device to output one or more special effects associated with the auditory input.

In some implementations, the special effect device comprises an audio speaker, and at least one of the one or more special effects includes audio content.

In some implementations, the special effect device comprises a home appliance. The home appliance includes a light source, and at least one of the one or more special effects includes light emission.

In some implementations, the special effect device comprises an audio speaker and a light source, and the at least one of the one or more special effects includes audio content and light emission.

In some implementations, the special effect device comprises a home appliance. The home appliance includes a light source, an audio speaker, a fan, a garage door, an alarm system, a heating or cooling system, a doorbell, a microwave, a refrigerator, or combinations thereof.

In some implementations, the pre-determined trigger comprises one or more trigger words corresponding to one or more trigger words of a text source.

In some implementations, the one or more trigger words of the text source are spoken prior to one or more feature words. The electronic device is configured to output one or more special effects generally simultaneously to an audible output of at least one of the one or more feature words.

One example aspect is directed to a system for providing a special effect associated with an auditory input. The system comprises an electronic device. The electronic device is configured to receive an audible input of one or more portions of a text source. The electronic device is also configured to access a plurality of pre-determined triggers. The pre-determined triggers comprise active pre-determined triggers and inactive pre-determined triggers. In response to determining that the audible input matches an active pre-determined trigger, the electronic device is configured to command a special effect device to output one or more special effects associated with the auditory input; or command the system to activate at least one of the plurality of inactive pre-determined triggers, and, in response to determining that the audible input matches the activated pre-determined trigger, command the special effect device to output one or more special effects associated with the auditory input.

In some implementations, the active pre-determined triggers correspond to one or more words of a first portion of the text source, and the inactive pre-determined triggers correspond to one or more words of a second portion of the text source.

In some implementations, one or more of the words of the first and second portions are the same.

In some implementations, the first portion is different than the second portion.

In some implementations, the first portion is associated with one chapter of the text source, and the second portion is associated with another second chapter of the text source.

In some implementations, in response to determining that the audible input matches an active pre-determined trigger, the electronic device is configured to command a special effect device to output one or more special effects associated with the auditory input, and command the system to activate at least one of the plurality of inactive pre-determined triggers; and, in response to determining that the audible input matches the activated pre-determined trigger, command the special effect device to output one or more special effects associated with the auditory input.

One example aspect is directed to a system for providing a special effect associated with an auditory input. The system comprises an electronic device. The electronic device is configured to receive an audible input of one or more portions of a text source. The electronic device is also configured to access a plurality of pre-determined triggers comprising active pre-determined triggers and inactive pre-determined triggers. The electronic device is also configured to, in response to determining that the audible input matches an active pre-determined trigger, command a first special effect device to output one or more first special effects associated with the auditory input, or command the system to activate at least one of the plurality of inactive pre-determined triggers; and, in response to determining that the audible input matches the activated pre-determined trigger, command the first special effect device or a second special effect device to output one or more first special effects associated with the auditory input. The electronic device is also configured to command the first special effect device to play a second special effect in response to determining that the one or more of the plurality of active or activated pre-determined triggers was detected.

In some implementations, the one or more active or activated pre-determined triggers causing output of the first special effect is different from the one or more pre-determined triggers causing output of the second special effect. In some implementations, the second special effect is output at least partly concurrently with the output of the first special effect.

In some implementations, the first or second special effect device comprises an audio speaker, and at least one of the one or more special effects includes audio content.

In some implementations, the first or second special effect device comprises a home appliance. The home appliance includes a light source. At least one of the one or more special effects includes light emission.

In some implementations, the first or second special effect device comprises an audio speaker and a light source. The at least one of the one or more special effects includes audio content and light emission.

In some implementations, the second special effect is output from the second special effect device.

In some implementations, the plurality of pre-determined triggers comprises one or more trigger words corresponding to one or more trigger words of the text source. In some implementations, one or more trigger words of the text source are spoken prior to one or more feature words. In some implementations, the electronic device is configured to output one or more special effects generally simultaneously to an audible output of at least one of the one or more feature words.

One example aspect is directed to a system for providing special effects in response to a user reading aloud a text source comprising a plurality of feature phrases and a plurality of trigger phrases. The system comprises one or more processors. The one or more processors are configured to access a database comprising a plurality of pre-determined trigger phrases, determine when one or more of the plurality of pre-determined trigger phrases is detected via a speech recognition algorithm, and command a special effect output device to play a special effect in response to determining that the pre-determined trigger was detected.

One example aspect is directed to a system for providing special effects in response to a user reading aloud a text source. The system comprises one or more processors. The one or more processors are configured to access a database comprising a plurality of pre-determined trigger phrases, determine when one of more of the plurality of pre-determined trigger phrases is detected via a speech recognition algorithm, and command a special effect output device to play a special effect in response to determining that the pre-determined trigger was detected, concurrently with playing the special effect, determine when a second pre-determined trigger phrase is detected via the speech recognition algorithm.

In some implementations, a plurality of pre-determined trigger phrases are correlated to a single special effect. In some implementations, in response to determining that one of the plurality of pre-determined trigger phrases are detected, the system plays the single special effect. In some implementations, the remainder of the plurality of pre-determined trigger phrases are deactivated from outputting the single special effect.

In some implementations, the one or more processors are configured to output the special effect in response to determining that two or more of the plurality of pre-determined trigger phrases are detected.

In some implementations, the one or more processors are configured to deactivate at least one of the plurality of pre-determined trigger phrases after detection of the at least one of the plurality of pre-determined trigger phrases such that a user subsequently reading the at least one of the plurality of pre-determined trigger phrases does not result in commanding the special effect output device to output a special effect.

In some implementations, the one or more processors are configured to keep at least one of the plurality of pre-determined trigger phrases active after detection such that a user subsequently reading the at least one of the plurality of pre-determined trigger phrases after detection of the at least one of the plurality of pre-determined trigger phrases results in commanding the special effect device to output a special effect again.

In some implementations, the one or more processors are configured to keep at least one of the plurality of pre-determined trigger phrases active after detection. In some implementations, upon a subsequent detection of the at least one of the plurality of pre-determined trigger phrases, the processors are configured to command the special effect output device to output a different special effect than was outputted upon the first detection of the at least one of the plurality of pre-determined trigger phrases.

In some implementations, the one or more processors are configured to temporarily deactivate for a pre-defined time period at least one of the plurality of pre-determined trigger phrases after detection of the at least one of the plurality of pre-determined trigger phrases such that a user subsequently reading the at least one of the plurality of pre-determined trigger phrases after detection of the at least one of the plurality of pre-determined trigger phrases and during its temporary deactivation does not result in commanding the special effect output device to output a special effect. In some implementations, subsequently, after the pre-defined time period has elapsed, the one or more processors are configured to reactivate the at least one of the plurality of pre-determined trigger phrases such that a subsequent detection of the at least one of the plurality of pre-determined trigger phrases, command the special effect output device to output a different special effect than outputting upon the first detection of the at least one of the plurality of pre-determined trigger phrases.

In some implementations, the one or more processors are further configured to command the special effect output device to play a second special effect concurrently with the first special effect.

In some implementations, the one or more processors are further configured to determine when a third pre-determined trigger phrase is detected via the speech recognition algorithm concurrently with playing the first and second special effect.

In some implementations, the one or more processors are further configured to command the special effect output device to play a third special effect in response to determining that the pre-determined trigger was detected.

One example aspect is directed to a system for providing special effects in response to a user reading aloud a text source. The system comprises one or more processors configured to access a database comprising a plurality of pre-determined trigger phrases. The system comprises the ability to determine when one or more of the plurality of pre-determined trigger phrases is detected via a speech recognition algorithm. The system comprises the ability to command a special effect output device to play a first special effect in response to determining that one or more of the plurality of pre-determined triggers was detected. The system comprises the ability to command the special effect output device to play a second special effect in response to determining that one or more of the plurality of pre-determined trigger phrases was detected. In some implementations, one or more of the plurality of pre-determined trigger phrases causing output of the first special effect is different from the one or more of the plurality of pre-determined trigger phrases causing output of the second special effect. In some implementations, the second special effect is outputted at least partly concurrently with outputting the first special effect. In some implementations, one or more processors are configured to determine when a pre-determined trigger phrase is detected via a speech recognition algorithm concurrently while playing the special effect.

One example aspect is directed to a system for providing special effects in response to a user reading aloud a text source. The system comprises a processor. The processor is configured to determine one or more of a plurality of databases to access. Each database comprises a plurality of pre-determined trigger phrases. The processor is configured to access one or more of a plurality of databases. The processor is configured to determine when one or more of the pre-determined trigger phrases is detected via a speech recognition algorithm. In some implementations, in response to determining that one or more of the pre-determined trigger phrases was detected, the processor is configured to command a special effect output device to output a special effect. In some implementations, in response to determining that one or more of the pre-determined trigger phrases was detected, the processor is configured to access a different database of pre-determined trigger phrases.

In some implementations, one or more of the pre-determined trigger phrases causing the outputting of a special effect is the same as one or more of the pre-determined trigger phrases causing the system to access a different datable of pre-determined trigger phrases.

In some implementations, one or more of the pre-determined trigger phrases causing the outputting of a special effect is different than one or more of the preOdetermined trigger phrases causing the system to access a different database of pre-determined trigger phrases.

One example aspect is directed to a system for providing special effects in response to a user reading a text source aloud. The system comprises one or more processors. The one or more processors are configured to access a database comprising a plurality of pre-determined trigger phrases. The plurality of pre-determined trigger phrases are also phrases in the text source. The one or more processors are configured to determine when one or more of the plurality of pre-determined trigger phrases is detected via a speech recognition algorithm when the user reads the text source aloud, and command a special effect output device to play one of a plurality of special effects in response to determining that the pre-determined trigger was detected. The one or more processors are configured to, upon a subsequent accessing of the database, command the special effect output device to play a different special effect among the plurality of special effects in response to determining that the same pre-determined trigger phrase was detected.

One example aspect is directed to a system for providing special effects in response to a user reading a text source. The system comprises one or more processors. The one or more processors are configured to access a first database comprising a first plurality of pre-determined trigger phrases. The one or more processors are configured to determine when one or more of the first plurality of pre-determined trigger phrases is detected via a speech recognition algorithm. The one or more processors are configured to command a special effect output device to play one of a plurality of special effects in response to determining that the one or more of the first plurality of pre-determined triggers was detected. The one or more processors are configured to, upon a subsequent initiation of the system, access a second database comprising a second plurality of pre-determined trigger phrases. In some implementations, at least one pre-determined trigger phrase in the first database is different from the second plurality of pre-determined trigger phrases.

One example aspect is directed to a system for providing dynamic special effects in response to a user reading a text source aloud. The system comprises one or more processors. The one or more processors are configured to access a database comprising a plurality of pre-determined trigger phrases. In some implementations, the plurality of pre-determined trigger phrases are also phrases in the text source. The one or more processors are configured to determine when one or more of the plurality of pre-determined trigger phrases is detected via a speech recognition algorithm when the user reads the text source aloud. The one or more processors are configured to command a special effect device to play one of a plurality of special effects in response to determining that the pre-determined trigger was detected. The one or more processors are configured to command the special effect output device to play one of a plurality of special effects in response to determining that a pre-determined quantity or sequence of pre-determined trigger phrases are detected.

In some implementations, the text source comprises a physical text source.

In some implementations, the text source comprises an electronically displayed text source.

One example aspect is directed to a system for providing special effects in response to a text source being read aloud. The system comprises of one or more processors. The one or more processors are configured to access a database comprising a plurality of pre-determined trigger phrases. The one or more processors are configured to determine when one or more of the plurality of pre-determined trigger phrases is detected from an electronically delivered auditory speech. The one or more processors are configured to command a special effect output device to play a special effect in response to determining that the pre-determined trigger was detected.

In some implementations, the electronically delivered auditory speech is pre-recorded.

In some implementations, the electronically delivered auditory speech is the form of an audiobook.

In some implementations, the electronically delivered auditory speech is the form of a movie.

In some implementations, the electronically delivered auditory speech is live.

In some implementations, the electronically delivered auditory speech is delivered from a live user.

In some implementations, the electronically delivered auditory speech is delivered from a recording of a live user.

In some implementations, the one or more processors are further configured to determine when one or more of the plurality of pre-determined trigger phrase is detected from live auditory speech delivered by a user. In some implementations, the one or more processors are further configured to command a special effect output device to play a special effect in response to determining that the pre-determined trigger was detected.

In some implementations, the text source is in the form of a physical text source.

In some implementations, the physical text source is in the form of a physical book.

In some implementations, the text source is in the form of an electronically displayed text source.

In some implementations, at least one special effect comprises an auditory special effect.

In some implementations, at least one special effect comprises a visual special effect.

In some implementations, at least one special effect comprises an environmental special effect.

In some implementations, the special effect is correlated to the text source.

In some implementations, the text source further comprises illustrations, and at least one special effect is correlated to the illustrations.

In some implementations, at least two special effects are outputted concurrently.

In some implementations, at least one special effect output device is physically distinct from one or more processors.

In some implementations, at least one special effect is outputted generally in real-time with the auditory speech comprising the pre-determined trigger phase is delivered.

One example aspect is directed to a system for providing special effects in response to a physical text source being read aloud. The system comprises of one or more processors. The one of more processors are configured to access a database comprising a plurality of pre-determined trigger phrases. The one or more processors are configured to determine when one or more of the plurality of pre-determined trigger phrases is detected from an electronically delivered auditory speech in the form of an audiobook. The one or more processors are configured to command a special effect output device to play a special effect in response to determining that the pre-determined trigger was detected.

In some implementations, the special effect comprises an auditory special effect.

In some implementations, the special effect comprises a visual special effect.

In some implementations, the special effect comprises an environmental special effect.

One example aspect is directed to a system for providing special effects in response to a media. The media comprises visual and auditory components being played. The system comprises one or more processors. The one or more processors are configured to access a database comprising a plurality of pre-determined trigger phrases. The one or more processors are configured to determine when one or more of the plurality of pre-determined trigger phrases is detected from an electronically delivered auditory speech from a media comprising visual and auditory components. The one or more processors are configured to command a special effect output device to play a special effect in response to determining that the pre-determined trigger was detected. In some implementations, the special effect is correlated to the media.

In some implementations, at least one special effect comprises an environmental special effect.

In some implementations, one or more processors are configured to command a special effect output device to play a special effect generally in real-time with the trigger phrase being delivered from the movie.

One example aspect is directed to a system for providing special effects in response to a user reading a text source. The system comprises one or more processors. The one or more processors are configured to access a database comprising a plurality of pre-determined trigger phrases. The one or more processors are configured to determine when one or more of the plurality of pre-determined trigger phrases is detected from an electronically delivered auditory speech from a media comprising visual and auditory components. The one or more processors are configured to command a special effect output device to play a special effect in response to determining that the pre-determined trigger was detected. In some implementations, the special effect is correlated to the media.

One example aspect is directed to a system for providing special effects in response to a text source being read aloud. The system comprises one or more processors. The one or more processors are configured to access a database comprising a plurality of pre-determined trigger phrases. The one or more processors are configured to determine when one or more of the plurality of pre-determined trigger phrases is detected from at least one of a plurality of auditory sensors. In some implementations, the plurality of auditory sensors are in different locations. The one or more processors are configured to command a plurality of special effect output devices to each generally simultaneously play a special effect in response to determining that the pre-determined trigger was detected.

In some implementations, one or more processors are configured to command a plurality of special effect output devices to each generally simultaneously play the same special effect in response to determining that the pre-determined trigger was detected.

In some implementations, one or more processors are configured to command a plurality of special effect output devices to each generally simultaneously play different special effects in response to determining that the pre-determined trigger was detected.

One example aspect is directed to a system for providing special effects in response to a text source being read aloud. The system comprises one or more processors. The one or more processors are configured to receive an auditory input from a first user. The one or more processors are configured to receive an auditory input from a second user. The one or more processors are configured to command a first special effect output device. In some implementations, the first special effect output device is in communication with the first user. The one or more processors are configured to command a second special effect output device. In some implementations, the second special effect output device is in communication with the second user. The one or more processors are configured to access a database comprising a plurality of pre-determined trigger phrases. The one or more processors are configured to determine when one or more of the plurality of pre-determined trigger phrases is detected from either the first user or the second user. In some implementations, the first user is in a different location than the second user. The one or more processors are configured to command the first special effect output device to play a special effect in response to determining that the pre-determined trigger was detected from the first user.

In some implementations, one or more processors are further configured to command the second special effect output device to play a special effect in response to determining that the pre-determined trigger phrase was detected from the second user.

In some implementations, one or more processors are configured to command the second special effect output device to play the same special effect as outputted by the first special effect output device in response to determining that the pre-determined trigger phrase was detected from the first user.

One example aspect is directed to a system for providing special effects in response to a user reading a text source. The system comprises one or more processors. The one or more processors are configured to access a database comprising a plurality of pre-determined trigger phrases. The one or more processors are configured to determine when a pre-determined trigger phrase is detected. The one or more processors are configured to command a special effect output device to play a special effect in response to determining that the pre-determined trigger was detected.

In some implementations, commanding the special effect comprises accessing sensory information about a remote location and outputting the special effect based, at least in-part, on the sensory information.

In some implementations, the sensory information comprises real-time sensory information.

In some implementations, the sensory information is updated at least once in a 24 hour period.

In some implementations, the sensory information is updated at least once in a 12 hour period.

In some implementations, the sensory information is updated at least once in a 1 hour period.

In some implementations, the sensory information comprises pre-recorded sensory information.

In some implementations, commanding the special effect comprises accessing sensory information comprising auditory information, visual information, environmental information, or combinations thereof about a remote location and outputting the special effect based, at least in-part, on the sensory information.

In some implementations, commanding the special effect comprises accessing sensory information comprising auditory information about a remote location and outputting the special effect based, at least in-part, on the auditory sensory information.

In some implementations, auditory information comprises sound detected from the remote location.

In some implementations, commanding the special effect comprises accessing sensory information comprising visual information about a remote location and outputting the special effect based, at least in-part, on the visual sensory information.

In some implementations, visual information comprises images, video, or a combination thereof recorded from the remote location.

In some implementations, commanding the special effect comprises accessing sensory information comprising environmental information about a remote location and outputting the special effect based, at least in-part, on the environmental sensory information.

In some implementations, the environmental information comprises weather information.

In some implementations, the environmental information comprises weather information comprising temperature information, pressure information, wind information, sun positioning information, or combinations thereof.

In some implementations, the environmental information comprises scent information.

In some implementations, the remote location is static.

In some implementations, the remote location is dynamic.

In some implementations, the remote location is separate and distinct from a special effect output location.

In some implementations, one or more processors are configured to determine when a trigger phrase is detected via a speech recognition engine.

In some implementations, one or more processors are configured to determine when a trigger phrase is detected via an algorithm adapted to determine a user's reading position.

In some implementations, one or more processors are configured to determine when a trigger phrase is detected concurrently with outputting a special effect.

One example aspect is directed to a system for providing special effects in response to a user reading aloud a text source. The system comprises one or more processors. The one of more processors are configured to access a first database comprising a first plurality of pre-determined trigger phrases. In some implementations, at least two of the first plurality of pre-determined trigger phrases are in a different language. The one or more processors are configured to determine when a pre-determined trigger phrase is detected via a speech recognition algorithm and determine the language of the detected pre-determined trigger phrase. The one or more processors are configured to access a second database comprising a second plurality of pre-determined trigger phrases in response to determining that at least one of the first plurality of pre-determined trigger phrases was detected. In some implementations, the second plurality of pre-determined trigger phrases is in the same language as the detected pre-determined trigger phrase in the first database. The one or more processors are configured to command a special effect output device to play a special effect in response to determining that at least one of the second plurality of pre-determined trigger phrases was detected.

In some implementations, the one or more processors are further configured to access a third database comprising a third plurality of pre-determined trigger phrases in response to determining that at least one of the first plurality of pre-determining trigger phrases having the same language as the language of the third plurality of pre-determined trigger phrases was detected.

In some implementations, the one or more processors are further configured to command the special effect output device to play the special effect in response to determining that at least one of the third plurality of pre-determined trigger phrases was detected.

In some implementations, the special effect is correlated to the text source.

One example aspect is directed to a device. The device comprises a microphone. The device comprises a speaker. The device comprises a communication assembly adapted to communicate with an electronic device. In some implementations, the device is in the form of a bookmark.

In some implementations, the communication assembly is adapted to wirelessly communication with the electronic device.

In some implementations, the communication assembly is adapted to wirelessly communicate through Bluetooth, wifi, or combinations thereof with the electronic device.

In some implementations, the electronic device comprises a mobile device, a computer, a smart home device, or any combinations thereof.

In some implementations, the device comprises an attachment portion adapted to attach to a book.

In some implementations, the device comprises an attachment portion comprising a clamp assembly adapted to removably couple the device to a book.

In some implementations, the device further comprises a display capable of displaying video content.

In some implementation, the display comprises a touchscreen.

One example aspect is directed to a system for providing synchronized special effects with a text source. The system comprises a text source comprising a plurality of text characters. The system comprises a processor. The processor is configured to receive an auditory input comprising an auditory sound of one or more of the plurality of text characters. The processor is configured to initiate one or more special effects correlated to the text source in response to detecting an auditory sound of one or more of the plurality of text characters. The system comprises a device, separate and distinct from the processor or a device containing the processor. In some implementations, the device comprises an auditory receptor and a communication assembly. In some implementations, the device is in the form of a bookmark. In some implementations, the communication assembly is adapted for communication with the processor to relay the auditory input.

One example aspect is directed to a system for providing auditory feedback in response to one or more users reading aloud a text source. The system comprises one or more processors. The one or more processors are configured to access a database comprising a plurality of pre-determined trigger phrases. The one or more processors are configured to determine when one or more of the plurality of pre-determined trigger phrases is detected via a speech recognition algorithm. The one or more processors are configured to command an auditory output device to play an auditory signal in response to determining that the pre-determined trigger was detected. In some implementations, the text source comprises a plurality of parts or characters. In some implementations, the one or more processors are further configured to selectively enable one or more of the characters to be enabled.

One example aspect is directed to a system for providing data analytics of a media. The system comprises one or more processors. The one or more processors are configured to receive an auditory input comprising a pre-determined trigger phrase. The one or more processors are configured to determine when the pre-determined trigger is detected. The one or more processors are configured to, in response to determining that the pre-determined trigger is detected, record and store analytical information related to the environment at the location of detection. In some implementations, the analytical information comprises time of trigger detection, date of trigger detection, location of trigger detection, volume of the auditory component of the media, distance from auditory component of the media, temperature information, humidity information, engagement with electronic device information, or combinations thereof.

One example aspect is directed to a system for providing dynamic interaction with media content. The system comprises one or more processors. The one or more processors are configured to receive an auditory input from a media comprising a pre-determined trigger phrase. The one or more processors are configured to determine when the pre-determined trigger phrase is detected. The one or more processors are configured to, in response to determining that the pre-determined trigger is detected. The one or more processors are configured to transmit a signal to one or more mobile devices. The one or more processors are configured to display content on the mobile device correlated to the pre-determined trigger.

One example aspect is directed to a system for providing special effects in response to a user reading aloud a text source. The system comprises one or more processors. The one or more processors are configured to access a database comprising a plurality of pre-determined trigger phrases. The one or more processors are configured to determine when one or more of the plurality of pre-determined trigger phrases is detected via a speech recognition algorithm. The one or more processors are configured to command a special effect output device to play a special effect in response to determining that the pre-determined trigger was detected. The one or more processors are configured to determine when a second pre-determined trigger phrase is detected via a speech recognition algorithm. The one or more processors are configured to command the special effect output device to manipulate the special effect in response to determine that the second pre-determined trigger phrase was detected.

What is claimed is:

1. A system for providing a special effect associated with an auditory input, the system comprising:
an electronic device configured to:
receive an audible input from a user comprising speech of the user reading one or more portions of a text source, wherein the electronic device is physically separate and distinct from the text source;
access a plurality of pre-determined triggers associated with the text source, wherein the plurality of pre-determined triggers comprise two or more active pre-determined triggers included in a current window of active triggers and one or more inactive pre-determined triggers that are not included in the current window, wherein the two or more active pre-determined triggers included in the current window of active triggers are determined based on a position within the text source of the one or more portions of the text source read by the user, wherein the electronic device is configured to cause one or more special effects upon matching the audible input to any of the two or more active pre-determined triggers but configured to not cause special effects upon matching the audible input to one of the one or more inactive pre-determined triggers;
determine whether the audible input matches at least one active trigger of the two or more active pre-determined triggers via a speech recognition algorithm;
in response to determining that the audible input matches a first active trigger of the two or more active pre-determined triggers, command a special effect device to output a first special effect associated with the text source, wherein the special effect device comprises an audio speaker, and wherein the first special effect comprises first audio content;
in response to determining that the audible input matches the first active trigger of the one or more active pre-determined triggers, modify the current window of active triggers to deactivate the first active trigger to an inactive pre-determined trigger that is not included in the current window; and
during playback of the first audio content by the special effect device:
continuously listen for and receive additional audible input from the user;
determine whether the additional audible input matches at least one active trigger via the speech recognition algorithm;
in response to determining that the additional audible input matches a second active trigger, command the special effect device to output a second special effect associated with the text source at least partially concurrently with output of the first special effect, wherein the second special effect is different than the first special effect; and
in response to determining that the additional audible input matches the second active trigger, modify the current window of active triggers to deactivate the second active trigger to be an inactive pre-determined trigger that is not included in the current window.

2. The system of claim 1, wherein the text source is pre-existing.

3. The system of claim 1, wherein the text source comprises a book.

4. The system of claim 1, wherein the text source comprises a comic book.

5. The system of claim 1, wherein the text source comprises a printed text source.

6. The system of claim 1, wherein the text source comprises an electronically displayed text source.

7. The system of claim 1, wherein the electronic device is configured to command the special effect device to begin outputting the first special effect before beginning to output the second special effect.

8. The system of claim 1, wherein the electronic device is configured to command the special effect device to stop outputting the first special effect before stopping the output of the second special effect.

9. The system of claim 1, wherein the electronic device is configured to command the special effect device to stop outputting the second special effect before stopping the output of the first special effect.

10. The system of claim 1, wherein the second special effect comprises a second audio output, and the electronic device is configured to cause output of a third special effect comprising a light emission.

11. The system of claim 1, wherein the electronic device is communicably coupled but physically distinct from the special effect device.

12. The system of claim 1, wherein at least one of the first or the second special effects comprises animation.

13. The system of claim 1, wherein at least one of the first or the second special effects comprises video.

14. The system of claim 1, wherein at least one of the first or the second special effects comprises a picture.

15. The system of claim 1, wherein in response to determining that the audible input matches the first active trigger of the one or more active pre-determined triggers the electronic device is configured to activate one of the one or more inactive pre-determined triggers.

16. The system of claim 1, wherein the audible input from the user comprising speech of the user reading one or more portions of the text source is pre-recorded and electronically outputted.

17. A system for providing a special effect associated with an auditory input, the system comprising:
an electronic device configured to:
receive an audible input from a user comprising speech of the user reading one or more portions of a text source;
access a plurality of pre-determined triggers associated with the text source, wherein the plurality of pre-determined triggers comprise two or more active pre-determined triggers included in a current window of active triggers and one or more inactive pre-determined triggers that are not included in the current window, wherein the two or more active pre-determined triggers included in the current window of active triggers are determined based on a position within the text source of the one or more portions of the text source read by the user, wherein the electronic device is configured to cause one or more special effects upon matching the audible input to any of the two or more active pre-determined triggers but configured to not cause special effects upon matching the audible input to one of the one or more inactive pre-determined triggers;
determine whether the audible input matches at least one active trigger of the two or more active pre-determined triggers via a speech recognition algorithm, wherein the one or more pre-determined triggers comprise active pre-determined triggers and inactive pre-determined triggers;

in response to determining that the audible input matches the at least one active trigger of the two or more active pre-determined triggers, command one or more special effect devices to output a plurality of special effects associated with the text source; and in response to determining that the audible input matches the at least one active trigger of the two or more active pre-determined triggers modify the current window of active triggers to deactivate the at least one active trigger to an inactive pre-determined trigger that is not included in the current window;

wherein the one or more special effect devices comprises an audio speaker, and the at least one of the one or more special effects includes audio content;

wherein the plurality of special effects comprises a first special effect comprising an audio output and a second special effect comprising an audio output different from the first special effect;

wherein the electronic device is configured to command the one or more special effect devices to output the second special effect at least partially concurrently with outputting the first special effect;

wherein the at least one active trigger comprises a first active trigger that causes output of the first special effect and a second active trigger that causes output of the second special effect, wherein the first active trigger is at least partly different than the second active trigger; and wherein the electronic device is configured to determine when an additional active trigger phrase is detected via the speech recognition algorithm at least partly concurrently while the one or more special effect devices are outputting the plurality of special effects.

18. A system for providing a special effect associated with an auditory input, the system comprising:

an electronic device configured to:

receive an audible input from a user comprising speech of the user reading one or more portions of a text source, wherein the text source comprises a printed book;

access a plurality of pre-determined triggers associated with the text source, wherein the plurality of pre-determined triggers comprise two or more active pre-determined triggers included in a current window of active triggers and one or more inactive pre-determined triggers that are not included in the current window, wherein the two or more active pre-determined triggers included in the current window of active triggers are determined based on a position within the text source of the one or more portions of the text source read by the user, wherein the electronic device is configured to cause one or more special effects upon matching the audible input to any of the two or more active pre-determined triggers but configured to not cause special effects upon matching the audible input to one of the one or more inactive pre-determined triggers;

determine whether the audible input matches at least one active trigger of the two or more active pre-determined triggers via a speech recognition algorithm;

in response to determining that the audible input matches the at least one active trigger of the two or more active pre-determined triggers, command one or more special effect devices to output a plurality of special effects associated with the text source; and in response to determining that the audible input matches the at least one active trigger of the two or more active pre-determined triggers, modify the current window of active triggers to deactivate the at least one active trigger to an inactive pre-determined trigger that is not included in the current window;

wherein the one or more special effect devices comprises an audio speaker and at least one of the plurality of special effects includes audio content;

wherein the plurality of special effects comprises a first special effect comprising an audio output, and a second special effect comprising an audio output different from the first special effect;

wherein the at least one active trigger comprises a first active trigger that causes output of the first special effect and a second active trigger that causes output of the second special effect, wherein the first active trigger is at least partly different than the second active trigger; and wherein the electronic device is configured to determine when an additional pre-determined trigger phrase is detected via the speech recognition algorithm at least partly concurrently while the one or more special effect devices are outputting the plurality of special effects.

* * * * *